US012602804B2

(12) United States Patent　(10) Patent No.: US 12,602,804 B2
Liu et al.　(45) Date of Patent: Apr. 14, 2026

(54) METHOD FOR PROCESSING THREE-DIMENSIONAL SCANNING, THREE-DIMENSIONAL SCANNING DEVICE, AND COMPUTER-READABLE STORAGE MEDIUM

(71) Applicant: SHINING 3D TECH CO., LTD., Hangzhou (CN)

(72) Inventors: Zengyi Liu, Hangzhou (CN); Xiaobo Zhao, Hangzhou (CN); Tengfei Jiang, Hangzhou (CN); Jian Zhang, Hangzhou (CN); Leijie Huang, Hangzhou (CN)

(73) Assignee: SHINING 3D TECH CO., LTD., Hangzhou (CN)

( * ) Notice: Subject to any disclaimer, the term of this patent is extended or adjusted under 35 U.S.C. 154(b) by 0 days.

(21) Appl. No.: 18/746,018

(22) Filed: Jun. 17, 2024

(65) Prior Publication Data

US 2024/0378737 A1　Nov. 14, 2024

Related U.S. Application Data

(63) Continuation of application No. PCT/CN2022/139716, filed on Dec. 16, 2022.

(30) Foreign Application Priority Data

Dec. 17, 2021　(CN) .......................... 202111556738.2

(51) Int. Cl.
　G06T 7/55　(2017.01)
　H04N 13/243　(2018.01)
　H04N 13/254　(2018.01)
(52) U.S. Cl.
　CPC ............. G06T 7/55 (2017.01); H04N 13/243 (2018.05); H04N 13/254 (2018.05)

(58) Field of Classification Search
None
See application file for complete search history.

(56) References Cited

U.S. PATENT DOCUMENTS 5,675,407 A * 10/1997 Geng ..................... G06T 7/521
356/123
10,379,393 B2 * 8/2019 Nezamabadi .......... G06T 7/521
(Continued)

FOREIGN PATENT DOCUMENTS

CN　　108288292 A　7/2018
CN　　111678459 A　9/2020
(Continued)

OTHER PUBLICATIONS

ISR for PCT/CN2022/139716 mailed on Mar. 13, 2023.
(Continued)

*Primary Examiner* — Daniel T Tekle
(74) *Attorney, Agent, or Firm* — Scully, Scott, Murphy & Presser, P.C.

(57) ABSTRACT

The present disclosure discloses a Method for Processing Three-dimensional Scanning, a three-dimensional scanning device, and a computer-readable storage medium. The method includes: projecting, by a pattern projector, a plurality of lines to a surface of an object-to-be-measured; collecting, by three cameras, two-dimensional images on the surface of the object-to-be-measured to correspondingly obtain three frames of two-dimensional images; determining matching point pairs between every two of the three frames of two-dimensional images to correspondingly obtain three sets of matching point pairs; verifying matching consistency between the matching point pairs; and performing three-dimensional reconstruction on the matching point pairs with the matching consistency to obtain three-dimensional points on the surface of the object-to-be-measured.

19 Claims, 3 Drawing Sheets

Cam L　　Cam M　　Projector　　Cam R

(56)                    References Cited

U.S. PATENT DOCUMENTS

| | | | |
|---|---|---|---|
| 10,839,557 B1 * | 11/2020 | Arora | G06T 19/006 |
| 10,878,536 B1 * | 12/2020 | Stimm | H04N 19/59 |
| 12,038,393 B2 * | 7/2024 | Maeder | B25J 19/023 |
| 2019/0236798 A1 | 8/2019 | Rochette et al. | |
| 2019/0242697 A1 * | 8/2019 | Zheng | G01B 11/254 |
| 2019/0353477 A1 | 11/2019 | Zheng et al. | |
| 2020/0225030 A1 * | 7/2020 | Zheng | G01B 11/245 |
| 2021/0044787 A1 * | 2/2021 | Matsunobu | H04N 13/25 |
| 2021/0364900 A1 * | 11/2021 | Hsien | G03B 21/2066 |
| 2022/0383549 A1 * | 12/2022 | Zheng | G06T 7/521 |

FOREIGN PATENT DOCUMENTS

| | | | |
|---|---|---|---|
| CN | 113390357 A | 9/2021 |
| JP | 2017510793 A | 4/2017 |
| WO | 2021088481 A1 | 5/2021 |
| WO | 2021121320 A1 | 6/2021 |

OTHER PUBLICATIONS

Extended European search report dated on Mar. 18, 2025 received in European Patent Application No. 22906705.3.
Notice of Reasons for Refusal dated Apr. 1, 2025 received in Japanese Patent Application No. 2024-535326.
The second Office Action of counterpart CA application No. 3,242,368 issued on Feb. 4, 2026.

* cited by examiner

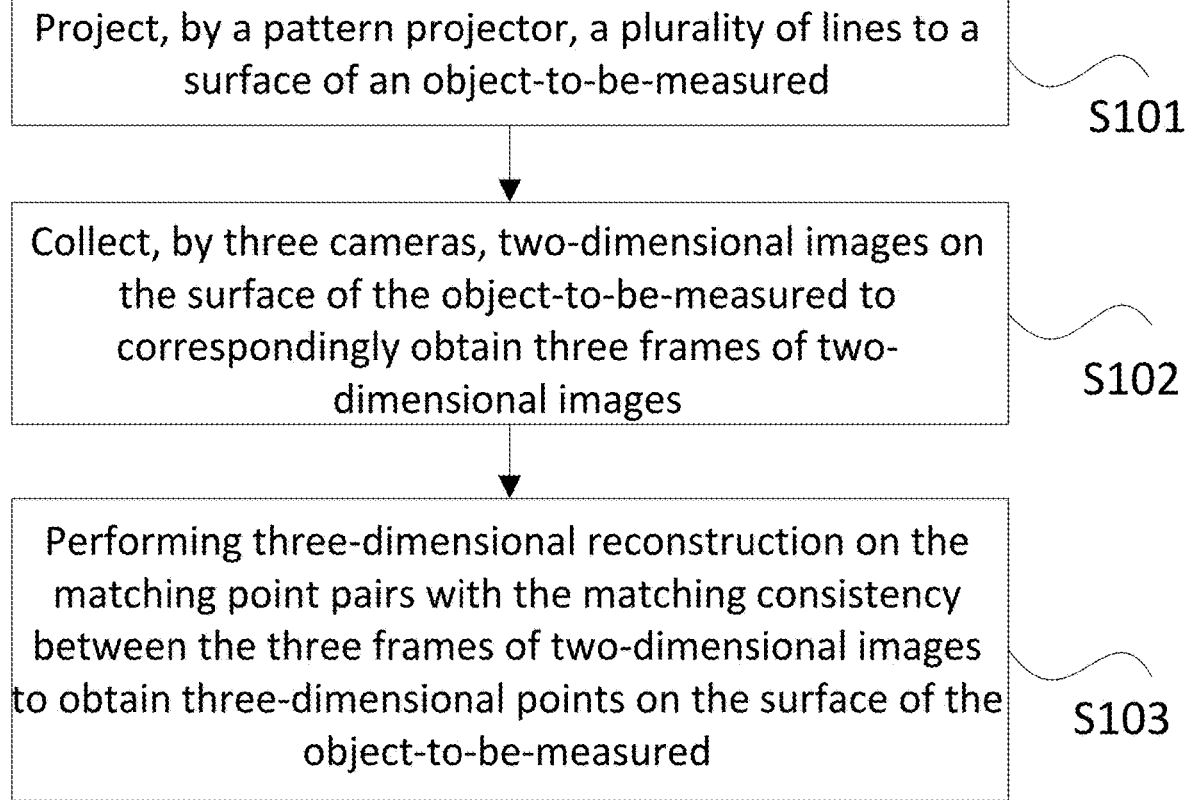

Project, by a pattern projector, a plurality of lines to a surface of an object-to-be-measured

S101

Collect, by three cameras, two-dimensional images on the surface of the object-to-be-measured to correspondingly obtain three frames of two-dimensional images

S102

Performing three-dimensional reconstruction on the matching point pairs with the matching consistency between the three frames of two-dimensional images to obtain three-dimensional points on the surface of the object-to-be-measured

METHOD FOR PROCESSING THREE-DIMENSIONAL SCANNING, THREE-DIMENSIONAL SCANNING DEVICE, AND COMPUTER-READABLE STORAGE MEDIUM

The present disclosure claims priority of Chinese Patent Application No. 202111556738.2, entitled "METHOD AND APPARATUS FOR PROCESSING THREE-DIMENSIONAL SCANNING, AND THREE-DIMENSIONAL SCANNING DEVICE", filed with China National Intellectual Property Administration on Dec. 17, 2021, which is incorporated herein by reference in its entirety.

TECHNICAL FIELD

The present disclosure relates to the technical field of three-dimensional scanning, and in particular to a Method for Processing Three-dimensional Scanning, a three-dimensional scanning device, and a computer-readable storage medium.

BACKGROUND

With the increasing maturity of a handheld three-dimensional scanning technology, the three-dimensional scanning technology is widely applied to the industry. In actual scanning scenarios, some industrial objects-to-be-measured are typically bulky industrial components, which have a high requirement for scanning efficiency. The current most common scanning solution is binocular laser scanning, and a number of laser lines in binocular laser scanning is 20 or below. However, this scanning efficiency cannot adapt to some scenarios requiring high scanning efficiency. The way to improve the scanning efficiency is to increase the number of scanning lines. However, in a binocular stereo vision system, an increase in the number of scanning lines can lead to a decrease in matching accuracy.

There is still no effective solution proposed to solve the problems that in related technologies, the scanning efficiency of the binocular laser scanning cannot adapt to some scenarios requiring high scanning efficiency, the method for improving the scanning efficiency is to increase the number of scanning lines, but an increase in the number of scanning lines in a binocular scanning system can lead to a sharp decline in matching accuracy.

SUMMARY

In order to achieve the above objectives, according to an aspect of the present disclosure, a method for processing three-dimensional scanning is provided. The method includes: a plurality of lines are projected to a surface of an object-to-be-measured by a pattern projector; two-dimensional images on the surface of the object-to-be-measured are collected by three cameras to correspondingly obtain three frames of two-dimensional images; matching point pairs between every two of the three frames of two-dimensional images are determined to correspondingly obtain three sets of matching point pairs; matching consistency between the three sets of matching point pairs is verified; and three-dimensional reconstruction is performed on the matching point pairs with the matching consistency to obtain three-dimensional points on the surface of the object-to-be-measured.

Alternatively, the step of matching point pairs between every two of the three frames of two-dimensional images are determined to correspondingly obtain three sets of matching point pairs includes: a plurality of lines in the three frames of two-dimensional images are obtained, wherein each line is composed of a plurality of pixel points; one pixel point on the line of one frame of two-dimensional image is adopted as a selected point, and a plurality of candidate matching points matched with the selected point from another frame of two-dimensional image are determined; three-dimensional reconstruction is performed on the selected point and the plurality of candidate matching points based on a triangulation principle to obtain a plurality of first candidate three-dimensional points; the first candidate three-dimensional points satisfying preset conditions are determined as second candidate three-dimensional points, wherein a plurality of second candidate three-dimensional points are provided; and the candidate matching points corresponding to the second candidate three-dimensional points and the selected point form the matching point pairs.

Alternatively, before matching consistency between the three sets of matching point pairs is verified, the method further includes: a plurality of light planes corresponding to the second candidate three-dimensional points are obtained, wherein the light planes are light planes corresponding to the selected point; and a target light plane corresponding to the selected point is determined from the plurality of light planes.

Alternatively, the step of a target light plane corresponding to the selected point is determined from the plurality of light planes includes: a plurality of light planes corresponding to a plurality of pixel points on the same line as the selected point are obtained; and an occurrence frequency of each light plane is calculated, and the light plane with the highest occurrence frequency is adopted as the target light plane.

Alternatively, the step of matching consistency between the three sets of matching point pairs is verified includes: a matching point corresponding to the target light plane is adopted as a target matching point; the selected point and the target matching point form a target matching point pair by, and three sets of target matching point pairs are obtained; and consistency between the three sets of target matching point pairs is verified.

Alternatively, the three frames of two-dimensional images are respectively a first-frame two-dimensional image, a second-frame two-dimensional image, and a third-frame two-dimensional image. The step of matching consistency between the three sets of target matching point pairs is verified includes: a selected point of the first-frame two-dimensional image, and a first target light plane determined by the selected point based on matching of the first-frame two-dimensional image and the second-frame two-dimensional image are obtained; a selected point of the first-frame two-dimensional image, and a second target light plane determined by the selected point based on matching of the first-frame two-dimensional image and the third-frame two-dimensional image are obtained; a target matching point, within the second-frame two-dimensional image, for the selected point from the first-frame two-dimensional image is obtained; a third target light plane determined by the target matching point in the second-frame two-dimensional image based on matching of the second-frame two-dimensional image and the third-frame two-dimensional image is obtained; whether the first target light plane, the second target light plane, and the third target light plane are a same light plane is determined; and when the first target light plane, the second target light plane, and the third target light plane are the same light plane, the three sets of target matching point pairs having matching consistency is determined.

Alternatively, the step of one pixel point on the line of one frame of two-dimensional image is adopted as a selected point, and a plurality of candidate matching points matched with the selected point from another frame of two-dimensional image are determined includes: an epipolar line equation of the selected point corresponding to the another frame of two-dimensional image is obtained; and intersection points of the epipolar line equation and a plurality of lines in the another frame of two-dimensional image are adopted as the plurality of candidate matching points.

In order to achieve the above objectives, according to another aspect of the present disclosure, a three-dimensional scanning device is provided. The device includes three cameras. The three cameras are combined in pair to obtain three binocular systems. The three binocular systems are configured to collect two-dimensional images on a surface of an object-to-be-measured to correspondingly obtain three frames of two-dimensional images, determine matching point pairs between every two of the three frames of two-dimensional images to correspondingly obtain three sets of matching point pairs, verify matching consistency between the three sets of matching point pairs, and perform three-dimensional reconstruction on the matching point pairs with the matching consistency to obtain three-dimensional points on the surface of the object-to-be-measured.

In order to achieve the above objectives, according to another aspect of the present disclosure, a apparatus for processing three-dimensional scanning is provided. The apparatus includes: a projection unit, configured to project, by a pattern projector, a plurality of lines to a surface of an object-to-be-measured; a collecting unit, configured to collect, by three cameras, two-dimensional images on the surface of the object-to-be-measured to correspondingly obtain three frames of two-dimensional images; a first determining unit, configured to determine matching point pairs between every two of the three frames of two-dimensional images to correspondingly obtain three sets of matching point pairs; a verification unit, configured to verify matching consistency between the three sets of matching point pairs; and a reconstruction unit, configured to perform three-dimensional reconstruction on the matching point pairs with the matching consistency to obtain three-dimensional points on the surface of the object-to-be-measured.

Alternatively, the determining unit includes: a first obtaining subunit, configured to obtain a plurality of lines in the three frames of two-dimensional images, wherein each line is composed of a plurality of pixel points; a first determining subunit, configured to adopt one pixel point on the line of one frame of two-dimensional image as a selected point, and determine a plurality of candidate matching points matched with the selected point from another frame of two-dimensional image; a reconstruction subunit, configured to perform three-dimensional reconstruction on the selected point and the plurality of candidate matching points based on a triangulation principle to obtain a plurality of first candidate three-dimensional points; a second determining subunit, configured to determine the first candidate three-dimensional points satisfying preset conditions as second candidate three-dimensional points, wherein a plurality of second candidate three-dimensional points are provided; and a first composition subunit, configured to form the matching point pairs by the candidate matching points corresponding to the second candidate three-dimensional points and the selected point.

Alternatively, the apparatus further includes: an obtaining unit, configured to obtain a plurality of light planes corresponding to the second candidate three-dimensional points before verifying matching consistency between the three sets of matching point pairs, wherein each light plane is a light plane corresponding to the selected point; and a second determining unit, configured to determine a target light plane corresponding to the selected point from the plurality of light planes.

Alternatively, the second determining unit includes: a second obtaining subunit, configured to obtain a plurality of light planes corresponding to a plurality of pixel points on the same line as the selected point; and a calculation subunit, configured to calculate an occurrence frequency of each light plane, and adopt the light plane with the highest occurrence frequency as a target light plane.

Alternatively, the verification unit includes: adopting a matching point corresponding to the target light plane as a target matching point; a second composition subunit, configured to form a target matching point pair by the selected point and the target matching point to obtain three sets of target matching point pairs; and a verification subunit, configured to verify consistency between the three sets of target matching points.

Alternatively, the three frames of two-dimensional images are respectively a first-frame two-dimensional image, a second-frame two-dimensional image, and a third-frame two-dimensional image. The verification subunit includes: a first obtaining module, configured to obtain a selected point of the first-frame two-dimensional image, and a first target light plane determined by the selected point based on matching of the first-frame two-dimensional image and the second-frame two-dimensional image; a second obtaining module, configured to obtain a selected point of the first-frame two-dimensional image, and a second target light plane determined by the selected point based on matching of the first-frame two-dimensional image and the third-frame two-dimensional image; a third obtaining module, configured to obtain a target matching point, within the second-frame two-dimensional image, for the selected point from the first-frame two-dimensional image; a fourth obtaining module, configured to obtain a third target light plane determined by the target matching point in the second-frame two-dimensional image based on matching of the second-frame two-dimensional image and the third-frame two-dimensional image; and a determination module, configured to determine whether the first target light plane, the second target light plane, and the third target light plane are a same light plane. When the first target light plane, the second target light plane, and the third target light plane are the same light plane, determine the three sets of target matching point pairs having matching consistency.

Alternatively, the first determining subunit includes: a fifth obtaining unit, configured to obtain an epipolar line equation of the selected point corresponding to another frame of two-dimensional image; and adopt intersection points of the epipolar line equation and a plurality of lines in the another frame of two-dimensional image as the plurality of candidate matching points.

In order to achieve the above objectives, according to another aspect of the present disclosure, a computer-readable storage medium is provided. The storage medium includes a stored program. The program executes any one of the processing methods for three-dimensional scanning.

In order to achieve the above objectives, according to another aspect of the present disclosure, a processor is provided. The processor is configured to run a program. The program, when running, executes any one of the processing methods for three-dimensional scanning.

BRIEF DESCRIPTION OF FIGURES

The drawings constituting a part of the present disclosure are used to provide a further understanding of the present disclosure. Exemplary embodiments of the present disclosure and descriptions thereof are used to explain the present disclosure, and do not constitute an improper limitation to the present disclosure. In the drawings:

FIG. 1 is a flowchart of a method for processing three-dimensional scanning according to an embodiment of the present disclosure;

DETAILED DESCRIPTION

It should be noted that embodiments of the present disclosure and features in the embodiments can be combined with each other in the case of no conflict. The present disclosure will be described in detail below with reference to the drawings and in conjunction with the embodiments.

In order to make those skilled in the art better understand solutions of the present application, the technical solutions in the embodiments of the present disclosure are clearly and completely described in conjunction with the drawings in the embodiments of the present disclosure as below, and it is apparent that the described embodiments are merely a part rather all embodiments of the present disclosure. Based on the embodiments of the present disclosure, all other embodiments obtained without making creative works by those of ordinary skill in the art fall within the scope of the protection of the present disclosure.

It should be noted that the terms "first", "second", and the like in the specification and claims of the present disclosure and the foregoing drawings are used to distinguish similar objects and do not necessarily describe a specific sequence or order. It should be understood that such used data is interchangeable where appropriate, so that the embodiments of the present disclosure described herein can be implemented in an order other than those illustrated or described herein. In addition, the terms "include", "comprise" and any other variations are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The present disclosure is described in conjunction with preferred implementation steps below. FIG. 1 is a flowchart of a method for processing three-dimensional scanning according to an embodiment of the present disclosure. As shown in FIG. 1, the method includes the following steps:

Step S101: A plurality of lines are projected to a surface of an object-to-be-measured by a pattern projector.

For example, a pattern projector of a three-dimensional scanning device projects a plurality of scanning lines (e.g., laser scanning lines) to a surface of an object needing construction of a three-dimensional model.

Step S102: Two-dimensional images on the surface of the object-to-be-measured are collected by three cameras to correspondingly obtain three frames of two-dimensional images.

Figure 2:
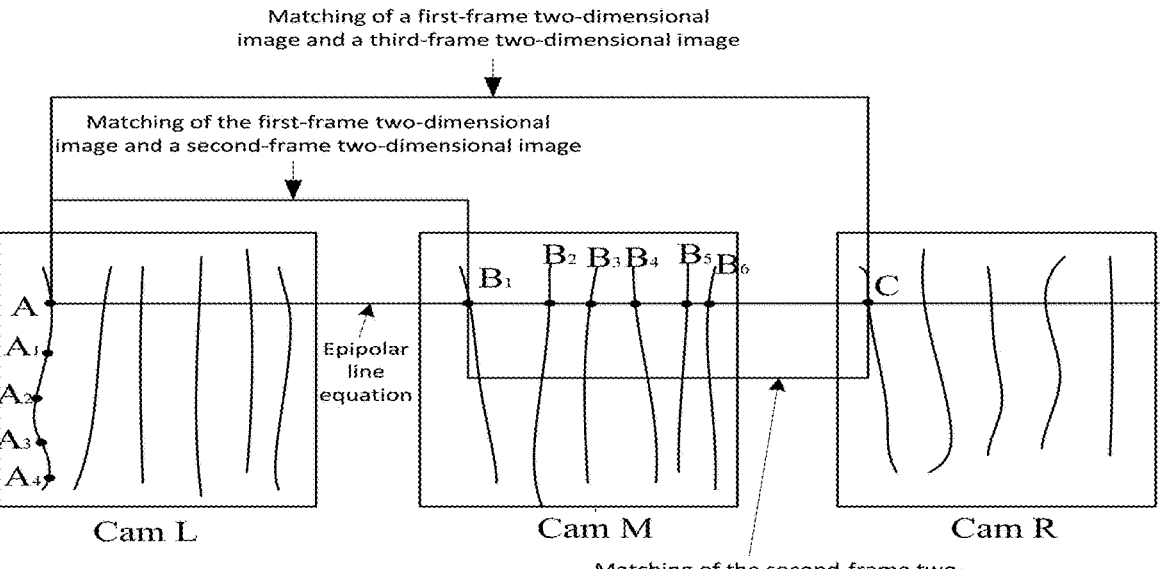
FIG. 2 is a schematic diagram of optional three frames of two-dimensional images according to an embodiment of the present disclosure.

The two-dimensional images on the surface of the object needing the construction of the three-dimensional model are collected through the three cameras (e.g., the three cameras are respectively Cam L, Cam M, and Cam R) of the three-dimensional scanning device to correspondingly obtain the three frames of two-dimensional images (e.g., three frames of two-dimensional images shown in FIG. 2). The three frames of two-dimensional images are respectively a first-frame two-dimensional image, a second-frame two-dimensional image, and a third-frame two-dimensional image. In this embodiment of the present disclosure, the three-dimensional scanning device is a handheld three-dimensional scanner, which can perform movable scanning relative to the object-to-be-measured. Preferably, the three cameras collect synchronously, that is, the three cameras collect synchronously at a first time and a second time until scanning is completed, ensuring correspondence of the images acquired by the three cameras. The three cameras may also be asynchronous, but it is necessary to ensure that a collection time interval is extremely short, and the position of the three-dimensional scanning device relative to the object-to-be-measured is almost unchanged. The three-dimensional scanning device is fixed to be used for each collection of the object-to-be-measured, that is, the three-dimensional scanning device is fixed to a first position for collection of a part of the object-to-be-measured, and then, fixed to a second position for collection of another part of the object-to-be-measured until the scanning of the object-to-be-measured is completed, and therefore there is no need to limit whether collection of the three cameras is synchronous.

Step S103: Three-dimensional reconstruction is performed on the matching point pairs with matching the consistency between the three frames of two-dimensional images to obtain three-dimensional points on the surface of the object-to-be-measured.

When the three sets of matching point pairs have matching consistency, the three-dimensional reconstruction is performed on the points to obtain the three-dimensional points of the object needing the construction of the three-dimensional model, and the three-dimensional model of the object is constructed based on the three-dimensional points.

Alternatively, in the method for processing three-dimensional scanning according to this embodiment of the present disclosure, the step of performing three-dimensional reconstruction on the matching point pairs with the matching consistency between the three frames of two-dimensional images to obtain three-dimensional points on the surface of the object-to-be-measured includes the following: matching point pairs between two of the three frames of two-dimensional images are determined; matching accuracy between the matching point pairs through third frame of the three frames of two-dimensional images is verified; three-dimensional reconstruction is performed on the matching point pairs with the matching accuracy to obtain three-dimensional points on the surface of the object-to-be-measured.

Wherein the matching point pairs with the matching consistency between the three frames of two-dimensional images refer to correctly matched matching points. Two of the three frames of two-dimensional images can be first and second frames of images. Matching accuracy between the matching point pairs through third frame of the three frames of two-dimensional images are verified refers to verifying whether the matching point pairs have mismatched through the association relationship between the third frame of images, the first frame of images, and the second frame of images. The matching point pairs have mismatched refers to matching the points at different positions of objects in the first and second frame of images. If the matching point pairs have not mismatched, it indicates that they have the matching consistency.

Alternatively, in the method for processing three-dimensional scanning according to this embodiment of the present disclosure, the step of verifying matching accuracy between the matching point pairs through third frame of the three frames of two-dimensional images includes the following: three-dimensional reconstruction is performed on the matching point pairs, and the reconstructed three-dimensional points are projected onto the third frame image; whether there are corresponding points of the three-dimensional points in the third frame image is determined through projection; in response to the corresponding points with the three-dimensional points in the third frame image, the matching point pairs have the matching accuracy is determined.

Wherein whether there are corresponding points of the three-dimensional points in the third frame image is determined through projection refers to projecting the reconstructed the three-dimensional points onto the third frame image, obtaining projection points, determining whether the projection points have corresponding points in the third frame image. In the case where the projection points have corresponding points in the third frame image, it indicates that there are corresponding points for the three-dimensional points in the third frame image, and confirming that the matching point pairs have the matching accuracy.

Alternatively, in the method for processing three-dimensional scanning according to this embodiment of the present disclosure, the step of performing three-dimensional reconstruction on the matching point pairs with the matching consistency between the three frames of two-dimensional images to obtain three-dimensional points on the surface of the object-to-be-measured includes the following: Matching point pairs between every two of the three frames of two-dimensional images are determined to correspondingly obtain three sets of matching point pairs; matching consistency between the matching point pairs is verified; three-dimensional reconstruction is performed on the matching point pairs with the matching consistency to obtain three-dimensional points on the surface of the object-to-be-measured.

The three frames of two-dimensional images are matched in pair to obtain corresponding three sets of matching point pairs. For example, as shown in FIG. 2, there is a point A (1, 2) on the first-frame two-dimensional image. The point A (1, 2) has a matching point with a coordinate $B_1$ (2, 3) obtained through matching on the second-frame two-dimensional image, and therefore the matching point pair of the first-frame two-dimensional image and the second-frame two-dimensional image is A (1, 2) and $B_1$ (2, 3). A (1, 2) has a matching point with a coordinate C (1, 3) obtained through matching on the third-frame two-dimensional image, and therefore the matching point pair of the first-frame two-dimensional image and the third-frame two-dimensional image is A (1, 2) and C (1, 3). $B_1$ (2, 3) on the second-frame two-dimensional image has a matching point C (1, 3) obtained through matching on the third-frame two-dimensional image, and therefore a matching point pair of the second-frame two-dimensional image and the third two-dimensional image is $B_1$ (2, 3) and C (1, 3).

Whether obtained three sets of matching point pairs have matching consistency is verified, and when the three sets of matching point pairs have matching consistency, the three-dimensional reconstruction is performed on the points to obtain the three-dimensional points of the object needing the construction of the three-dimensional model, and the three-dimensional model of the object is constructed based on the three-dimensional points.

Through the above steps, the two-dimensional images of the object are collected by the three cameras to obtain the three frames of two-dimensional images, the three frames of two-dimensional images are matched in pair to obtain the matching point pairs, the three-dimensional reconstruction is performed on the matching point pairs with the matching consistency, and therefore the three-dimensional model of the object is obtained, and matching accuracy of the three-dimensional reconstruction is improved.

Alternatively, in the method for processing three-dimensional scanning according to this embodiment of the present disclosure, the step of matching point pairs between every two of the three frames of two-dimensional images are determined to correspondingly obtain three sets of matching point pairs includes the following: a plurality of lines in the three frames of two-dimensional images are obtained, wherein each line is composed of a plurality of pixel points, one pixel point on the line of one frame of two-dimensional image is adopted as a selected point, and a plurality of candidate matching points matched with the selected point from another frame of two-dimensional image are determined; three-dimensional reconstruction is performed on the selected point and the plurality of candidate matching points based on a triangulation principle to obtain a plurality of first candidate three-dimensional points; the first candidate three-dimensional points satisfying preset conditions are determined as second candidate three-dimensional points, wherein a plurality of second candidate three-dimensional points are provided; and the candidate matching points corresponding to the second candidate three-dimensional points and the selected point form a matching point pair.

For example, as shown in FIG. 2, the three frames of two-dimensional images include a plurality of lines (i.e., a plurality of scanning lines projected by the pattern projector). Each line is composed of a plurality of pixel points. In FIG. 2, an image corresponding to Cam L is the first-frame two-dimensional image, an image corresponding to Cam M is the second-frame two-dimensional image, and an image corresponding to Cam H is the third-frame two-dimensional image. The point A in the first-frame two-dimensional image is adopted as the selected point, and a plurality of candidate matching points matched with A are found in the second-frame two-dimensional image. For example, the candidate matching points in the second-frame two-dimensional image are $B_1$, $B_2$, $B_3$, $B_4$, $B_5$, and $B_6$. Through triangulation, three-dimensional reconstruction is performed on the point A and the candidate matching points $B_1$, $B_2$, $B_3$, $B_4$, $B_5$, and $B_6$ to obtain a plurality of first candidate three-dimensional points $O_1$, $O_2$, $O_3$, $O_4$, $O_5$, and $O_6$. Preliminary screening is performed on the first candidate three-dimensional points, and the first candidate three-dimensional points satisfying preset conditions are adopted as the second candidate three-dimensional points. A screening method involves calculating a distance Distance(k) between each first candidate three-dimensional point and each of light planes Planes (k) corresponding to all the scanning lines. If a distance value of a certain first candidate three-dimensional point is within a set distance threshold, namely, Distance (k)<dist TH, it indicates that the first candidate three-dimensional point is within a $k^{th}$ light plane ($k^{th}$ projection line), that is, the first candidate three-dimensional point satisfies the preset requirements. Assuming that the second candidate three-dimensional points are $O_1$, $O_2$, and $O_3$, the candidate matching points $B_1$, $B_2$, and $B_3$ corresponding to $O_1$, $O_2$, and $O_3$ form matching point pairs with the point A. Through the above method, the matching point on the second-frame two-dimensional image for each pixel point on the first-frame two-dimensional image is obtained. Similarly, by adopting the same method, the matching point pair of the first-frame two-dimensional image and the third-frame two-dimensional image, and the matching point pair of the second-frame two-dimensional image and the third-frame two-dimensional image are obtained.

By acquiring the plurality of lines in the three frames of two-dimensional images, coordinates of the pixel points in the three frames of two-dimensional images can be determined. By performing pairwise matching on the three frames of two-dimensional images, the three sets of matching point pairs are obtained, thereby effectively improving matching accuracy.

Alternatively, in the method for processing three-dimensional scanning according to this embodiment of the present disclosure, before matching consistency between the three sets of matching point pairs is verified, the method further includes the following. A plurality of light planes corresponding to the second candidate three-dimensional points are obtained, wherein the light planes are light planes corresponding to the selected point; a target light plane corresponding to the selected point is determined from the plurality of light planes.

Before verifying the three sets of matching point pairs, an optimal matching point pair needs to be determined. Theoretically, only one of a plurality of matching point pairs obtained after matching two frames of two-dimensional images is correct, and therefore it is necessary to determine the optimal matching point pair. Firstly, the second candidate three-dimensional point is determined by calculating the distance Distance (k) between the point and the light planes Planes (k) corresponding to each scanning line. If a distance value of a certain second candidate three-dimensional point is within the set distance threshold, namely, Distance (k)<dist TH, it indicates that the point is within the $k^{th}$ light plane ($k^{th}$ projection line). That is, one second candidate three-dimensional point will correspond to one light plane. For example, the light planes corresponding to the second candidate three-dimensional points $O_1$, $O_2$, and $O_3$ are respectively $K_1$, $K_2$, and $K_3$. The optimal light plane (i.e., the above target light plane) is selected from these light planes.

The obtained three sets of matching point pairs are further screened, such that reconstruction three-dimensional points on the surface of the object can be obtained more accurately.

Alternatively, in the method for processing three-dimensional scanning according to this embodiment of the present disclosure, the step of a target light plane corresponding to the selected point is determined from the plurality of light planes includes the following: a plurality of light planes corresponding to a plurality of pixel points on the same line as the selected point are obtained; and an occurrence frequency of each light plane is calculated, and the light plane with the highest occurrence frequency is adopted as the target light plane.

For example, the method for selecting the optimal light plane from the light planes $K_1$, $K_2$, and $K_3$ is to first obtain a plurality of light planes corresponding to a plurality of pixel points on the same line as a selected point. As shown in FIG. 2, a plurality of pixel points $A_1$, $A_2$, $A_3$, and $A_4$ are located on the same line as the point A. A plurality of light planes $K_1$ and $K_2$ correspond to $A_1$; a plurality of light planes $K_1$ and $K_4$ correspond to $A_2$; a plurality of light planes $K_1$, $K_2$, and $K_3$ correspond to $A_3$; a plurality of light planes $K_1$ and $K_2$ correspond to $A_4$; and the occurrence frequency of each light plane is calculated, and the light plane with the highest occurrence frequency is adopted as an optimal light plane, that is, the optimal light plane corresponding to the point A is $K_1$. In the process of practical applications, the lines in the three frames of two-dimensional images may be discontinuous lines, and in this case, the optimal light plane corresponding to the selected point can be determined by obtaining a plurality of light planes corresponding to a plurality of pixel points within a search neighborhood on the line with the selected point.

By determining the optimal light plane corresponding to the selected point from the plurality of light planes corresponding to the plurality of pixel points on the same line as the selected point, the accuracy of determining the light planes corresponding to the pixel points is improved.

Alternatively, in the method for processing three-dimensional scanning according to this embodiment of the present disclosure, the step of matching consistency between the three sets of matching point pairs is verified includes the following: a matching point corresponding to the target light plane is adopted as a target matching point; the selected point and the target matching point form a target matching point pair, and three sets of target matching point pairs are obtained; and consistency between the three sets of target matching point pairs is verified.

Verification of the matching consistency between the three sets of matching point pairs only requires verification of consistency between optimal matching point pairs (i.e., the above target matching point pairs). The matching point corresponding to the optimal light plane is the optimal matching point. For example, the optimal matching point pair of the first-frame two-dimensional image and the second-frame two-dimensional image is A (1, 2) and $B_1$ (2, 3), and the corresponding optimal light plane is $K_1$. The optimal matching point pair of the first-frame two-dimensional image and the third-frame two-dimensional image is A (1, 2) and C (1, 3), and the corresponding optimal light plane is $K_1$; and the optimal matching point pair of the second-frame two-dimensional image and the third-frame two-dimensional image is $B_1$ (2, 3) and C (1, 3), and the corresponding optimal light plane is $K_1$.

Only the three-dimensional points reconstructed by the optimal matching point pairs are potentially the three-dimensional points on the surface of the object needing the construction of the three-dimensional model, which requires verification of consistency between the optimal matching point pairs.

Alternatively, in the method for processing three-dimensional scanning according to this embodiment of the present disclosure, the three frames of two-dimensional images are respectively a first-frame two-dimensional image, a second-frame two-dimensional image, and a third-frame two-dimensional image. The step of matching consistency between the three sets of target matching point pairs is verified includes the following: a selected point of the first-frame two-dimensional image, and a first target light plane determined by the selected point based on matching of the first-frame two-dimensional image and the second-frame two-dimensional image are obtained; a selected point of the first-frame two-dimensional image, and a second target light plane determined by the selected point based on matching of the first-frame two-dimensional image and the third-frame two-dimensional image are obtained; a target matching point, within the second-frame two-dimensional image, for the selected point from the first-frame two-dimensional image is obtained; a third target light plane determined by the target matching point in the second-frame two-dimensional image based on matching of the second-frame two-dimensional image and the third-frame two-dimensional image is obtained; whether the first target light plane, the second target light plane, and the third target light plane are a same light plane is determined; and when the first target light plane, the second target light plane, and the third target light plane are the same light plane, the three sets of target matching point pairs having matching consistency is determined.

For example, there is a point A (1, 2) on the first-frame two-dimensional image. The point A (1, 2) has an optimal matching point with a coordinate $B_1$ (2, 3) obtained through matching on the second-frame two-dimensional image, and therefore an optimal matching point pair of the first-frame two-dimensional image and the second-frame two-dimensional image is A (1, 2) and $B_1$ (2, 3), and a corresponding optimal light plane is $K_1$. The point A (1, 2) has an optimal matching point with a coordinate C (1, 3) obtained through matching on the third-frame two-dimensional image, and therefore an optimal matching point pair of the first-frame two-dimensional image and the third-frame two-dimensional image is A (1, 2) and C (1, 3), and a corresponding optimal light plane is $K_1$. An optimal matching point, obtained through matching on the third-frame two-dimensional image, for $B_1$ (2, 3) on the second-frame two-dimensional image is C (1, 3), and therefore an optimal matching point pair of the second-frame two-dimensional image and the third-frame two-dimensional image is $B_1$ (2, 3) and C (1, 3), and a corresponding optimal light plane is $K_1$. Based on the above examples, the optimal light plane obtained through pairwise matching is the same, namely $K_1$, which indicates that the three sets of optimal matching point pairs have matching consistency.

The reason for determining whether the matching points have matching consistency by verifying the light planes corresponding to the matching point pairs is that only when the light planes are the same can it be ensured that the matching point pairs represent the same three-dimensional point in three dimensions. Therefore, the aforementioned steps further enhance the accuracy of matching.

Alternatively, in the method for processing three-dimensional scanning according to this embodiment of the present disclosure, the step of one pixel point on the line of one frame of two-dimensional image is adopted as a selected point, and a plurality of candidate matching points matched with the selected point from another frame of two-dimensional image are determined includes the following: an epipolar line equation of the selected point corresponding to the another frame of two-dimensional image is obtained; and intersection points of the epipolar line equation and a plurality of lines in the another frame of two-dimensional image are adopted as the plurality of candidate matching points.

For example, a plurality of candidate matching points within the second-frame two-dimensional image are determined for the point A on the first-frame two-dimensional image through the epipolar line equation. Firstly, the epipolar line equation is calculated based on relative positions of Cam L and Cam M, such as a schematic epipolar line equation marked in FIG. 2. Intersection points of the epipolar line equation and a plurality of lines in another frame of two-dimensional image are adopted as the plurality of candidate matching points.

In the method for processing three-dimensional scanning according to this embodiment of the present disclosure, the plurality of lines are projected to the surface of the object-to-be-measured by the pattern projector; the two-dimensional images on the surface of the object-to-be-measured are collected by three cameras to correspondingly obtain the three frames of two-dimensional images; the matching point pairs between every two of the three frames of two-dimensional images are determined to correspondingly obtain the three sets of matching point pairs; the matching consistency between the three sets of matching point pairs is verified; the three-dimensional reconstruction is performed on the matching point pairs with the matching consistency to obtain the three-dimensional points on the surface of the object-to-be-measured. The problems that in related technologies, scanning efficiency of binocular laser scanning cannot adapt to some scenarios requiring high scanning efficiency, the method for improving the scanning efficiency is to increase a number of scanning lines, but an increase in the number of scanning lines in a binocular scanning system can lead to a sharp decline in matching accuracy are solved. The three cameras collect the two-dimensional images on the surface of the object-to-be-measured to obtain the three frames of two-dimensional images. The three frames of two-dimensional images are matched in pair to obtain the three sets of matching point pairs. The three-dimensional reconstruction is performed on the matching point pairs with the matching consistency to obtain the three-dimensional points on the surface of the object-to-be-measured, thereby achieving the effect of improving matching accuracy.

An embodiment of the present disclosure further provides a three-dimensional scanning device. The three-dimensional scanning device includes three cameras. The three cameras are combined in pair to obtain three binocular systems. The three binocular systems are configured to collect two-dimensional images on a surface of an object-to-be-measured to correspondingly obtain three frames of two-dimensional images, determine matching point pairs between every two of the three frames of two-dimensional images to correspondingly obtain three sets of matching point pairs, verify matching consistency between the three sets of matching point pairs, and perform three-dimensional reconstruction on the matching point pairs with the matching consistency to obtain three-dimensional points on the surface of the object-to-be-measured.

Figure 3:
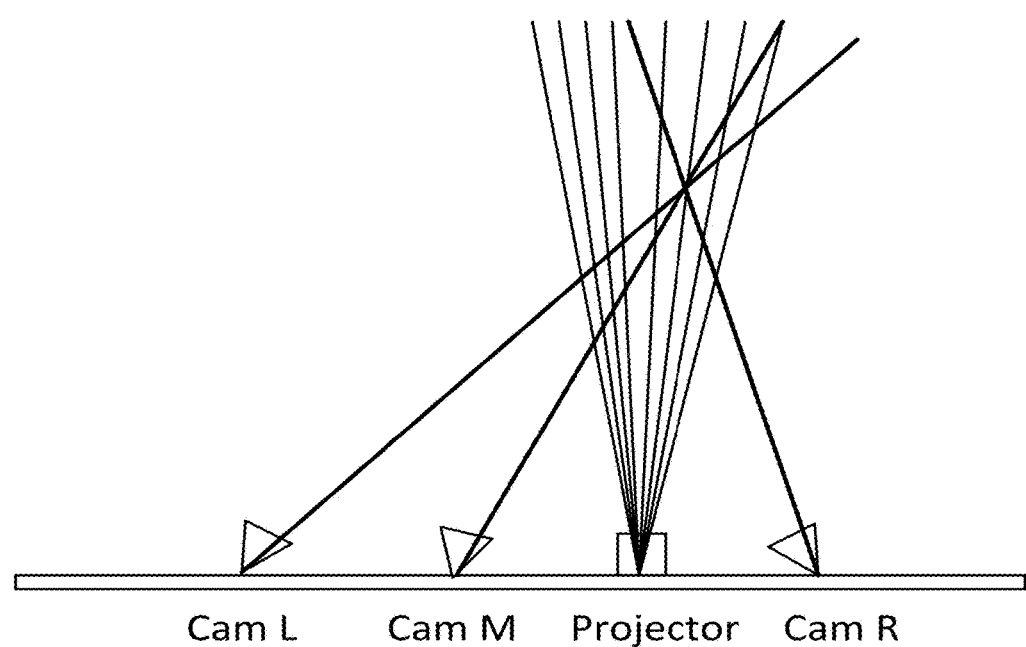
FIG. 3 is a schematic diagram of an optional three-dimensional scanning device according to an embodiment of the present disclosure.

As shown in FIG. 3, the figure is a schematic diagram of an optional three-dimensional scanning device provided according to an embodiment of the present disclosure. Cam L, Cam M, and Cam R are three cameras, and every two of the three cameras form three binocular systems. A projector is a pattern projector.

It should be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

An embodiment of the present disclosure further provides a apparatus for processing three-dimensional scanning. It should be noted that the apparatus for processing three-dimensional scanning according to this embodiment of the present disclosure can be used for executing the method for processing three-dimensional scanning provided by this embodiment of the present disclosure. The apparatus for processing three-dimensional scanning according to this embodiment of the present disclosure is introduced below.

Figure 4:
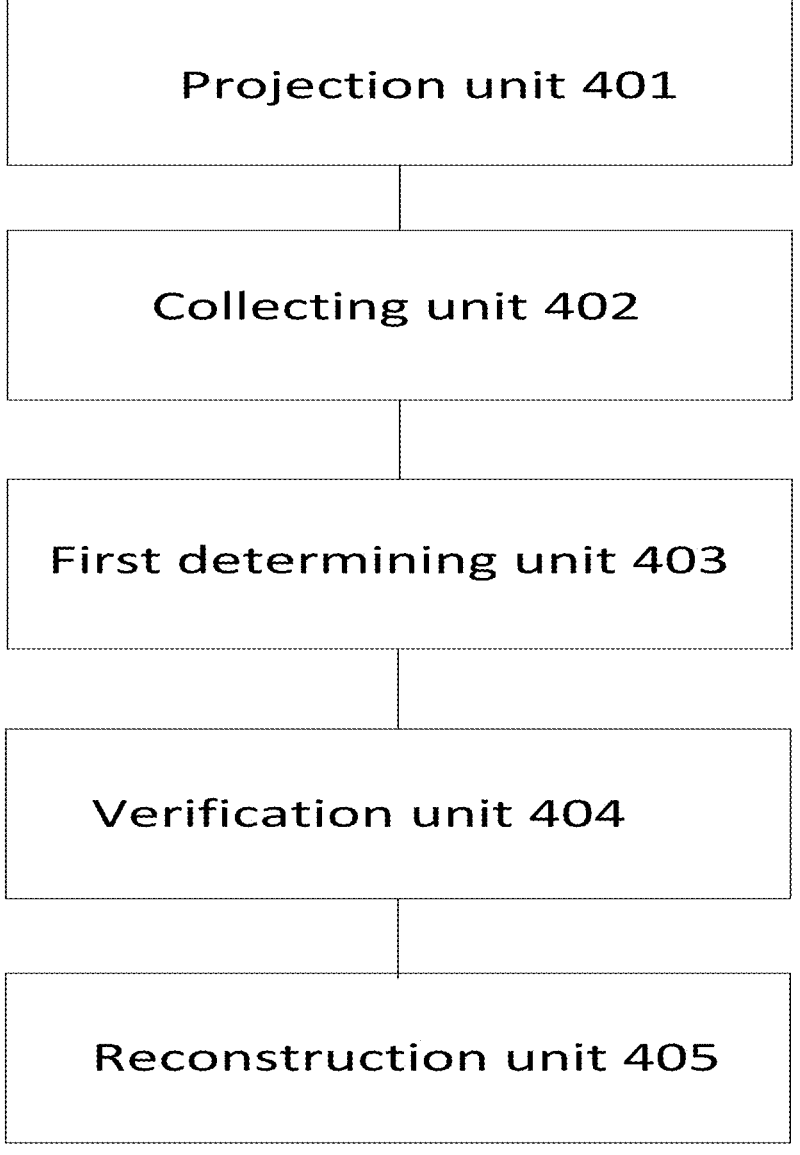
FIG. 4 is a schematic diagram of a apparatus for processing three-dimensional scanning according to an embodiment of the present disclosure.

FIG. 4 is a schematic diagram of a apparatus for processing three-dimensional scanning according to an embodiment of the present disclosure. As shown in FIG. 4, the apparatus includes: a projection unit 401, a collecting unit 402, a first determining unit 403, a verification unit 404, and a reconstruction unit 405.

The projection unit 401 is configured to project, by a pattern projector, a plurality of lines to a surface of an object-to-be-measured.

The collecting unit 402 is configured to collect, by three cameras, two-dimensional images on the surface of the object-to-be-measured to correspondingly obtain three frames of two-dimensional images.

The first determining unit 403 is configured to determine matching point pairs between every two of the three frames of two-dimensional images to correspondingly obtain three sets of matching point pairs.

The verification unit 404 is configured to verify matching consistency between the three sets of matching point pairs.

The reconstruction unit 405 is configured to perform three-dimensional reconstruction on the matching point pairs with the matching consistency to obtain three-dimensional points on the surface of the object-to-be-measured.

According to the apparatus for processing three-dimensional scanning according to this embodiment of the present disclosure, the projection unit 401 projects, by the pattern projector, the plurality of lines to the surface of the object-to-be-measured; the collecting unit 402 collects, by the three cameras, the two-dimensional images on the surface of the object-to-be-measured to correspondingly obtain the three frames of two-dimensional images; the first determining unit 403 determines the matching point pairs between every two of the three frames of two-dimensional images to correspondingly obtain the three sets of matching point pairs; the verification unit 404 verifies the three sets of matching consistency between the matching point pairs; and the reconstruction unit 405 performs the three-dimensional reconstruction on the matching point pairs with the matching consistency to obtain the three-dimensional points on the surface of the object-to-be-measured. The problems that in related technologies, the scanning efficiency of binocular laser scanning cannot adapt to some scenarios requiring high scanning efficiency, the method for improving the scanning efficiency is to increase the number of scanning lines, but an increase in the number of scanning lines in the binocular scanning system can lead to a sharp decline in matching accuracy are solved. The three cameras collect the two-dimensional images on the surface of the object-to-be-measured to obtain the three frames of two-dimensional images. The three frames of two-dimensional images are matched in pair to obtain the three sets of matching point pairs. The three-dimensional reconstruction is performed on the matching point pairs with the matching consistency to obtain the three-dimensional points on the surface of the object-to-be-measured, thereby achieving the effect of improving matching accuracy.

Alternatively, in the apparatus for processing three-dimensional scanning according to this embodiment of the present disclosure, the determining unit includes: a first obtaining subunit, configured to obtain a plurality of lines in the three frames of two-dimensional images before determining matching point pairs between every two of three frames of two-dimensional images to correspondingly obtain three sets of matching point pairs, wherein each line is composed of a plurality of pixel points; a first determining subunit, configured to adopt one pixel point on the line of one frame of two-dimensional image as a selected point, and determine a plurality of candidate matching points matched with the selected point from another frame of two-dimensional image; a reconstruction subunit, configured to perform three-dimensional reconstruction on the selected point and the plurality of candidate matching points based on a triangulation principle to obtain a plurality of first candidate three-dimensional points; a second determining subunit, configured to determine the first candidate three-dimensional points satisfying preset conditions as second candidate three-dimensional points, where a plurality of second candidate three-dimensional points are provided; and a first composition subunit, configured to form matching point pairs by candidate matching points corresponding to the second candidate three-dimensional points and the selected point.

Alternatively, in the apparatus for processing three-dimensional scanning according to this embodiment of the present disclosure, the apparatus further includes: an obtaining unit, configured to obtain a plurality of light planes corresponding to the second candidate three-dimensional points before verifying matching consistency between the three sets of matching point pairs, wherein each light plane is a light plane corresponding to the selected point; and a second determining unit, configured to determine a target light plane corresponding to the selected point from the plurality of light planes.

Alternatively, in the apparatus for processing three-dimensional scanning according to this embodiment of the present disclosure, the second determining unit includes: a second obtaining subunit, configured to obtain a plurality of light planes corresponding to a plurality of pixel points on the same line as the selected point; and a calculation subunit, configured to calculate an occurrence frequency of each light plane, and adopt the light plane with the highest occurrence frequency as a target light plane.

Alternatively, in the apparatus for processing three-dimensional scanning according to this embodiment of the present disclosure, the verification unit includes: adopting a matching point corresponding to the target light plane as a target matching point; a second composition subunit, configured to form a target matching point pair by the selected point and the target matching point to obtain three sets of target matching point pairs; and a verification subunit, configured to verify consistency between the three sets of target matching points.

Alternatively, in the apparatus for processing three-dimensional scanning according to this embodiment of the present disclosure, the three frames of two-dimensional images are respectively a first-frame two-dimensional image, a second-frame two-dimensional image, and a third-frame two-dimensional image. The verification subunit includes: a first obtaining module, configured to obtain a selected point of the first-frame two-dimensional image, and a first target light plane determined by the selected point based on matching of the first-frame two-dimensional image and the second-frame two-dimensional image; a second obtaining module, configured to obtain a selected point of the first-frame two-dimensional image, and a second target light plane determined by the selected point based on matching of the first-frame two-dimensional image and the third-frame two-dimensional image; a third obtaining module, configured to obtain a target matching point, within the second-frame two-dimensional image, for the selected point from the first-frame two-dimensional image; a fourth obtaining module, configured to obtain a third target light plane determined by the target matching point in the second-frame two-dimensional image based on matching of the second-frame two-dimensional image and the third-frame two-dimensional image; and a determination module, configured to determine whether the first target light plane, the second target light plane, and the third target light plane are a same light plane, when the first target light plane, the second target light plane, and the third target light plane are the same light plane, determine the three sets of target matching point pairs having matching consistency.

Alternatively, in the apparatus for processing three-dimensional scanning according to this embodiment of the present disclosure, the first determining subunit includes: a fifth obtaining unit, configured to obtain an epipolar line equation of the selected point corresponding to another frame of two-dimensional image; and adopt intersection points of the epipolar line equation and a plurality of lines in the another frame of two-dimensional image as a plurality of candidate matching points.

The apparatus for processing three-dimensional scanning includes a processor and a memory. The projection unit, the collecting unit, the first determining unit, the verification unit, the reconstruction unit, etc. are all stored in the memory as program units, and the processor executes the program units stored in the memory to achieve corresponding functions.

The processor includes a core, and the core invokes a corresponding program unit from the memory. One or more cores may be set, and the reconstruction of the three-dimensional points of the object-to-be-measured is implemented by adjusting core parameters.

The memory may include forms of a volatile memory, a Random Access Memory (RAM) and/or a non-volatile memory in computer-readable media, such as a Read-Only Memory (ROM) or a flash RAM. The memory includes at least one storage chip.

An embodiment of the present disclosure provides a computer-readable storage medium, storing a program. The program, when executed by a processor, implements a method for processing three-dimensional scanning.

An embodiment of the present disclosure provides a processor. The processor is configured to run a program. The program, when running, executes a method for processing three-dimensional scanning.

An embodiment of the present disclosure provides a device. The device includes a processor, a memory, and a program stored on the memory and runnable on the processor. The processor, when executing a program, implements the following steps: a plurality of lines are projected to a surface of an object-to-be-measured by a pattern projector; two-dimensional images on the surface of the object-to-be-measured are collected by three cameras to correspondingly obtain three frames of two-dimensional images; matching point pairs between every two of the three frames of two-dimensional images are determined to correspondingly obtain three sets of matching point pairs; matching consistency between the three sets of matching point pairs is verified; and three-dimensional reconstruction is performed on the matching point pairs with the matching consistency to obtain three-dimensional points on the surface of the object-to-be-measured.

Alternatively, the step of matching point pairs between every two of the three frames of two-dimensional images are determined to correspondingly obtain three sets of matching point pairs includes the following: a plurality of lines in the three frames of two-dimensional images are obtained, wherein each line is composed of a plurality of pixel points; one pixel point on the line of one frame of two-dimensional image is adopted as a selected point, and a plurality of candidate matching points matched with the selected point from another frame of two-dimensional image are determined; three-dimensional reconstruction is performed on the selected point and the plurality of candidate matching points based on a triangulation principle to obtain a plurality of first candidate three-dimensional points; the first candidate three-dimensional points satisfying preset conditions are determined as second candidate three-dimensional points, wherein a plurality of second candidate three-dimensional points are provided, and candidate matching points corresponding to the second candidate three-dimensional points and the selected point form the matching point pairs.

Alternatively, before matching consistency between the three sets of matching point pairs is verified, the method further includes the following: a plurality of light planes corresponding to the second candidate three-dimensional points are obtained, wherein the light planes are light planes corresponding to the selected point; and a target light plane corresponding to the selected point is determined from the plurality of light planes.

Alternatively, the step of a target light plane corresponding to the selected point is determined from the plurality of light planes includes the following: a plurality of light planes corresponding to a plurality of pixel points on the same line as the selected point are obtained; and an occurrence frequency of each light plane is calculated, and the light plane with the highest occurrence frequency is adopted as the target light plane.

Alternatively, the step of matching consistency between the three sets of matching point pairs is verified includes: a matching point corresponding to the target light plane is adopted as a target matching point; the selected point and the target matching point form a target matching point pair, and three sets of target matching point pairs are obtained; and consistency between the three sets of target matching point pairs is verified.

Alternatively, the three frames of two-dimensional images are respectively a first-frame two-dimensional image, a second-frame two-dimensional image, and a third-frame two-dimensional image. The step of matching consistency between the three sets of target matching point pairs is verified includes the following: a selected point of the first-frame two-dimensional image, and a first target light plane determined by the selected point based on matching of the first-frame two-dimensional image and the second-frame two-dimensional image are obtained; a selected point of the first-frame two-dimensional image, and a second target light plane determined by the selected point based on matching of the first-frame two-dimensional image and the third-frame two-dimensional image are obtained; a target matching point, within the second-frame two-dimensional image, for the selected point from the first-frame two-dimensional image is obtained; a third target light plane determined by the target matching point in the second-frame two-dimensional image based on matching of the second-frame two-dimensional image and the third-frame two-dimensional image is obtained; whether the first target light plane, the second target light plane, and the third target light plane are the same light plane is determined; and when the first target light plane, the second target light plane, and the third target light plane are the same light plane, the three sets of target matching point pairs having matching consistency is determined.

Alternatively, the step of one pixel point on the line of one frame of two-dimensional image is adopted as a selected point, and a plurality of candidate matching points matched with the selected point from another frame of two-dimensional image are determined includes the following: an epipolar line equation of the selected point corresponding to the another frame of two-dimensional image is obtained; and intersection points of the epipolar line equation and a plurality of lines in the another frame of two-dimensional image are adopted as the plurality of candidate matching points. The device herein may be a server, a Personal Computer (PC), a Portable Android Device (PAD), a mobile phone, etc.

The present disclosure further provides a computer program product. The computer program product, when executed on a data processing device, is suitable for executing a program initialized with following method steps: a plurality of lines are projected to a surface of an object-to-be-measured by a pattern projector; two-dimensional images on the surface of the object-to-be-measured are collected by three cameras to correspondingly obtain three frames of two-dimensional images; matching point pairs between every two of the three frames of two-dimensional images are determined to correspondingly obtain three sets of matching point pairs; matching consistency between the three sets of matching point pairs is verified; and three-dimensional reconstruction is performed on the matching point pairs with the matching consistency to obtain three-dimensional points on the surface of the object-to-be-measured.

Alternatively, the step of matching point pairs between every two of the three frames of two-dimensional images are determined to correspondingly obtain three sets of matching point pairs includes the following: a plurality of lines in the three frames of two-dimensional images are obtained, wherein each line is composed of a plurality of pixel points; one pixel point on the line of one frame of two-dimensional image is adopted as a selected point, and a plurality of candidate matching points matched with the selected point from another frame of two-dimensional image are determined; three-dimensional reconstruction is performed on the selected point and the plurality of candidate matching points based on a triangulation principle to obtain a plurality of first candidate three-dimensional points; the first candidate three-dimensional points satisfying preset conditions are determined as second candidate three-dimensional points, wherein a plurality of second candidate three-dimensional points are provided, and candidate matching points corresponding to the second candidate three-dimensional points and the selected point form the matching point pairs.

Alternatively, before matching consistency between the three sets of matching point pairs is verified, the method further includes the following: a plurality of light planes corresponding to the second candidate three-dimensional points are obtained, wherein the light planes are light planes corresponding to the selected point; and a target light plane corresponding to the selected point is determined from the plurality of light planes.

Alternatively, the step of a target light plane corresponding to the selected point is determined from the plurality of light planes includes the following: a plurality of light planes corresponding to a plurality of pixel points on the same line as the selected point are obtained; and an occurrence frequency of each light plane is calculated, and the light plane with the highest occurrence frequency is adopted as the target light plane.

Alternatively, the step of matching consistency between the three sets of matching point pairs is verified includes: a matching point corresponding to the target light plane is adopted as a target matching point; the selected point and the target matching point form a target matching point pair, and three sets of target matching point pairs are obtained; and consistency between the three sets of target matching point pairs is verified.

Alternatively, the three frames of two-dimensional images are respectively a first-frame two-dimensional image, a second-frame two-dimensional image, and a third-frame two-dimensional image. The step of matching consistency between the three sets of target matching point pairs is verified includes the following: a selected point of the first-frame two-dimensional image, and a first target light plane determined by the selected point based on matching of the first-frame two-dimensional image and the second-frame two-dimensional image are obtained; a selected point of the first-frame two-dimensional image, and a second target light plane determined by the selected point based on matching of the first-frame two-dimensional image and the third-frame two-dimensional image are obtained; a target matching point, within the second-frame two-dimensional image, for the selected point from the first-frame two-dimensional image is obtained; a third target light plane determined by the target matching point in the second-frame two-dimensional image based on matching of the second-frame two-dimensional image and the third-frame two-dimensional image is obtained; whether the first target light plane, the second target light plane, and the third target light plane are the same light plane is determined; and when the first target light plane, the second target light plane, and the third target light plane are the same light plane, the three sets of target matching point pairs having matching consistency is determined.

Alternatively, the step of one pixel point on the line of one frame of two-dimensional image is adopted as a selected point, and a plurality of candidate matching points matched with the selected point from another frame of two-dimensional image are determined includes the following: an epipolar line equation of the selected point corresponding to the another frame of two-dimensional image is obtained; and intersection points of the epipolar line equation and a plurality of lines in the another frame of two-dimensional image are adopted as the plurality of candidate matching points.

The present application is described with reference to the flowcharts and/or block diagrams of methods, devices (systems) and computer program products according to the embodiments of the present application. It should be understood that computer program instructions can implement each flow and/or block in the flowcharts and/or the block diagrams, and a combination of flows and/or blocks in the flowcharts and/or block diagrams. These computer program instructions can be provided to a general-purpose computer, a special-purpose computer, an embedded processor, or a processor of another programmable data processing device to generate a machine, such that an apparatus configured to implement functions specified in one flow or more flows in the flowcharts and/or one block or more blocks in the block diagrams is generated by using instructions executed by the computer or the processor of the another programmable data processing device.

These computer program instructions may also be stored in a computer-readable memory capable of instructing the computer or other programmable data processing device to work in a specific manner, such that a product including an instruction apparatus may be generated by the instructions stored in the computer-readable memory. The instruction apparatus realizes the function specified in one flow or more flows in the flowcharts and/or one block or more blocks in the block diagrams.

These computer program instructions may also be loaded onto the computer or other programmable data processing device, such that a series of operating steps are executed in the computer or other programmable device to generate processing implemented by the computer, and steps for realizing the function specified in one flow or more flows in the flowcharts and/or one block or more blocks in the block diagrams are provided by the instructions executed in the computer or other programmable device.

In a typical configuration, a computing device includes one or more Central Processing Units (CPUs), an input/output interface, a network interface, and a memory.

The memory may include a volatile memory, a Random Access Memory (RAM) and/or a non-volatile memory in computer-readable media, such as a Read-Only Memory (ROM) or a flash RAM. The memory is an example of the computer-readable media.

The computer-readable media include non-volatile and volatile, removable and non removable media. Information can be stored in any way or by any technology. Information can be computer readable instructions, data structures, the modules of the programs or other data. The memory media of the computer include but not limited to Phase-change Random Access Memory (PRAM), Static Random Access Memory (SRAM), Dynamic Random Access Memory (DRAM), other types of Random Access Memories (RAM), Read-Only Memory (ROM), Electrically Erasable Programmable Read-Only Memory (EEPROM), flash memory or other memory technologies, Compact Disk-Read-Only Memory (CD-ROM), Digital Versatile Disc (DVD) or other optical memories, cassette tape, disk storage or other magnetic storage devices or any other non-transport media. The memory media can be used for storing the information which the computer can access. As defined in this specification, the computer-readable media do not include transitory media, such as modulated data signals and carrier waves.

It should also be noted that terms "include", "comprise" or any other variations thereof herein are intended to contain non-exclusive inclusion, so that processes, methods, articles or devices including a series of elements not only include those elements, but also include other elements which are not clearly listed, or also include inherent elements of the processes, methods, articles or devices. The elements defined by a statement "include a . . . " shall not exclude the condition that other same elements also exist in the processes, methods, articles or devices including the elements under the condition that no more restraints are required.

Those skilled in the art should understand that the embodiments of the present application may be provided as a method, a system, or a computer program product. Therefore, the embodiments of the present application can be implemented in forms of full hardware, full software, combination of software and hardware. And the embodiments of the present application can be implemented in a form of a computer program product capable of being implemented on available computer memory media (containing but not limited to disk memory, CD-ROM, optical memory, etc.) containing one or more available computer program codes.

The foregoing descriptions are merely embodiments of the present application, and are not intended to limit the present application. For those skilled in the art, various modifications and variations can be made to the present application. Any modification, equivalent replacement, improvement, etc. made within the spirit and principle of the present application shall fall within the scope of the claims of the present application.

INDUSTRIAL APPLICABILITY

According to the Method and Apparatus for Processing Three-dimensional Scanning, and the three-dimensional scanning device provided by the embodiments of the present disclosure, the pattern projector projects the plurality of lines to the surface of the object-to-be-measured; the three cameras collect the two-dimensional images on the surface of the object-to-be-measured to correspondingly obtain the three frames of two-dimensional images; the matching point pairs between every two of the three frames of two-dimensional images are determined to correspondingly obtain the three sets of matching point pairs; the matching consistency between the matching point pairs is verified; the three-dimensional reconstruction is performed on the matching point pairs with the matching consistency to obtain the three-dimensional points on the surface of the object-to-be-measured. The problems that in related technologies, the scanning efficiency of binocular laser scanning cannot adapt to some scenarios requiring high scanning efficiency, the method for improving the scanning efficiency is to increase the number of scanning lines, but an increase in the number of scanning lines in a binocular scanning system can lead to a sharp decline in matching accuracy are solved. The three cameras collect the two-dimensional images on the surface of the object-to-be-measured to obtain the three frames of two-dimensional images. The three frames of two-dimensional images are matched in pair to obtain the three sets of matching point pairs. The three-dimensional reconstruction is performed on the matching point pairs with the matching consistency to obtain the three-dimensional points on the surface of the object-to-be-measured, thereby achieving the effect of improving matching accuracy.

What is claimed is:

1. A method for processing three-dimensional scanning, comprising:

projecting, by a pattern projector, a plurality of lines to a surface of an object-to-be-measured;

collecting, by three cameras, two-dimensional images on the surface of the object-to-be-measured to correspondingly obtain three frames of two-dimensional images;

performing three-dimensional reconstruction on the matching point pairs with the matching consistency between the three frames of two-dimensional images to obtain three-dimensional points on the surface of the object-to-be-measured, wherein the performing three-dimensional reconstruction comprises:

determining matching point pairs between every two of the three frames of two-dimensional images to correspondingly obtain three sets of matching point pairs;

verifying matching consistency between the three sets of matching point pairs; and performing three-dimensional reconstruction on the matching point pairs with the matching consistency to obtain three-dimensional points on the surface of the object-to-be-measured.

2. The method as claimed in 1, wherein the determining matching point pairs between every two of the three frames of two-dimensional images to correspondingly obtain three sets of matching point pairs comprises:

obtaining a plurality of lines in the three frames of two-dimensional images, wherein each line is composed of a plurality of pixel points;

adopting one pixel point on the line of one frame of two-dimensional image as a selected point, and determining a plurality of candidate matching points matched with the selected point from another frame of two-dimensional image;

performing three-dimensional reconstruction on the selected point and the plurality of candidate matching points based on a triangulation principle to obtain a plurality of first candidate three-dimensional points;

determining the first candidate three-dimensional points satisfying preset conditions as second candidate three-dimensional points, wherein a plurality of second candidate three-dimensional points are provided; and forming the matching point pairs by the candidate matching points corresponding to the second candidate three-dimensional points and the selected point.

3. The method as claimed in 2, wherein before verifying matching consistency between the three sets of matching point pairs, the method further comprises:

obtaining a plurality of light planes corresponding to the second candidate three-dimensional points, wherein the light planes are light planes corresponding to the selected point; and determining a target light plane corresponding to the selected point from the plurality of light planes.

4. The method as claimed in 3, wherein the determining a target light plane corresponding to the selected point from the plurality of light planes comprises:

obtaining a plurality of light planes corresponding to a plurality of pixel points on the same line as the selected point; and calculating an occurrence frequency of each light plane, and adopting the light plane with the highest occurrence frequency as the target light plane.

5. The method as claimed in 4, wherein the verifying matching consistency between the three sets of matching point pairs comprises:

adopting a candidate matching point corresponding to the target light plane as a target matching point;

forming a target matching point pair by the selected point and the target matching point, and obtaining three sets of target matching point pairs; and verifying matching consistency between the three sets of target matching point pairs.

6. The method as claimed in 5, wherein the three frames of two-dimensional images are respectively a first-frame two-dimensional image, a second-frame two-dimensional image, and a third-frame two-dimensional image, and the verifying matching consistency between the three sets of target matching point pairs comprises:

obtaining a selected point of the first-frame two-dimensional image, and a first target light plane determined by the selected point based on matching of the first-frame two-dimensional image and the second-frame two-dimensional image;

obtaining a selected point of the first-frame two-dimensional image, and a second target light plane determined by the selected point based on matching of the first-frame two-dimensional image and the third-frame two-dimensional image;

obtaining a target matching point, within the second-frame two-dimensional image, for the selected point from the first-frame two-dimensional image;

obtaining a third target light plane determined by the target matching point in the second-frame two-dimensional image based on matching of the second-frame two-dimensional image and the third-frame two-dimensional image;

determining whether the first target light plane, the second target light plane, and the third target light plane are a same light plane; and when the first target light plane, the second target light plane, and the third target light plane are the same light plane, determining the three sets of target matching point pairs having matching consistency.

7. The method as claimed in 3, wherein obtaining a plurality of light planes corresponding to the second candidate three-dimensional points comprises:

individually determining light planes corresponding to all scanning lines that are within a distance threshold from each second candidate three-dimensional point, obtaining a plurality of light planes corresponding to the second candidate three-dimensional points.

8. The method as claimed in 5, wherein the method further comprises:

determining the target light plane corresponding to the selected point by obtaining a plurality of light planes corresponding to a plurality of pixel points within a search neighborhood on the line with the selected point.

9. The method as claimed in 2, wherein the adopting one pixel point on the line of one frame of two-dimensional image as a selected point, and determining a plurality of candidate matching points matched with the selected point from another frame of two-dimensional image comprises:

obtaining an epipolar line equation of the selected point corresponding to the another frame of two-dimensional image; and adopting intersection points of the epipolar line equation and a plurality of lines in the another frame of two-dimensional image as the plurality of candidate matching points.

10. The method as claimed in 9, wherein the method further comprises:

determining the epipolar line equation based on relative positions of two cameras.

11. The method as claimed in 2, wherein determining the first candidate three-dimensional points satisfying preset conditions as second candidate three-dimensional points comprises:

respond to a first candidate three-dimensional point is within any of light planes corresponding to all the scanning lines, determining the first candidate three-dimensional point satisfies the preset condition.

12. The method as claimed in 2, wherein determining the first candidate three-dimensional points satisfying preset conditions as second candidate three-dimensional points comprises:

calculating distances between a first candidate three-dimensional point and each of light planes corresponding to all the scanning lines, obtaining multiple distances;

respond to a distance value of the multiple distances is within a set distance threshold, determining the first candidate three-dimensional point satisfies the preset requirement.

13. The method as claimed in 1, wherein the performing three-dimensional reconstruction on the matching point pairs with the matching consistency between the three frames of two-dimensional images to obtain three-dimensional points on the surface of the object-to-be-measured comprises:

determining matching point pairs between two of the three frames of two-dimensional images;

verifying matching accuracy between the matching point pairs through third frame of the three frames of two-dimensional images; and performing three-dimensional reconstruction on the matching point pairs with the matching accuracy to obtain three-dimensional points on the surface of the object-to-be-measured.

14. The method as claimed in 13, wherein the verifying matching accuracy between the matching point pairs through third frame of the three frames of two-dimensional images comprises:

performing three-dimensional reconstruction on the matching point pairs, and projecting the reconstructed three-dimensional points onto the third frame image;

determining whether there are corresponding points of the three-dimensional points in the third frame image through projection;

in response to the corresponding points with the three-dimensional points in the third frame image, determining that the matching point pairs have the matching accuracy.

15. The method as claimed in 1, wherein projecting, by a pattern projector, a plurality of lines to a surface of an object-to-be-measured comprises:

projecting, by the pattern projector of a three-dimensional scanning device, a plurality of scanning lines to the surface of the object-to-be-measured.

16. The method as claimed in 1, wherein collecting, by three cameras, two-dimensional images on the surface of the object-to-be-measured to correspondingly obtain three frames of two-dimensional images comprises:

collecting synchronously, by the three cameras at same times until scanning is completed, the two-dimensional images on the surface of the object-to-be-measured to correspondingly obtain the three frames of two-dimensional images.

17. The method as claimed in 1, wherein after performing three-dimensional reconstruction on the matching point pairs with the matching consistency to obtain three-dimensional points on the surface of the object-to-be-measured, the method further comprises:

constructing a three-dimensional model based on the three-dimensional points on the surface of the object-to-be-measured.

18. A three-dimensional scanning device, wherein the three-dimensional scanning device comprises three cameras, the three cameras are combined in pair to obtain three binocular systems, wherein the three binocular systems are configured to:

collect two-dimensional images on a surface of an object-to-be-measured to correspondingly obtain three frames of two-dimensional images, determine matching point pairs between every two of the three frames of two-dimensional images to correspondingly obtain three sets of matching point pairs, verify matching consistency between the three sets of matching point pairs, and perform three-dimensional reconstruction on the matching point pairs with the matching consistency to obtain three-dimensional points on the surface of the object-to-be-measured, wherein the three binocular systems are further configured to:

determine matching point pairs between every two of the three frames of two-dimensional images to correspondingly obtain three sets of matching point pairs;

verify matching consistency between the three sets of matching point pairs; and perform three-dimensional reconstruction on the matching point pairs with the matching consistency to obtain three-dimensional points on the surface of the object-to-be-measured.

19. A non-transitory computer-readable storage medium, wherein the storage medium comprises a stored program, and the program executes following steps:

projecting, by a pattern projector, a plurality of lines to a surface of an object-to-be-measured;

collecting, by three cameras, two-dimensional images on the surface of the object-to-be-measured to correspondingly obtain three frames of two-dimensional images;

performing three-dimensional reconstruction on the matching point pairs with the matching consistency between the three frames of two-dimensional images to obtain three-dimensional points on the surface of the object-to-be-measured, wherein the performing three-dimensional reconstruction comprises:

determining matching point pairs between every two of the three frames of two-dimensional images to correspondingly obtain three sets of matching point pairs;

verifying matching consistency between the three sets of matching point pairs; and performing three-dimensional reconstruction on the matching point pairs with the matching consistency to obtain three-dimensional points on the surface of the object-to-be-measured.

* * * * *